Sept. 2, 1969 R. MURPHY 3,464,609
VIBRATORY CANDY BREAKER AND SEPARATOR
Filed May 19, 1967 3 Sheets-Sheet 1
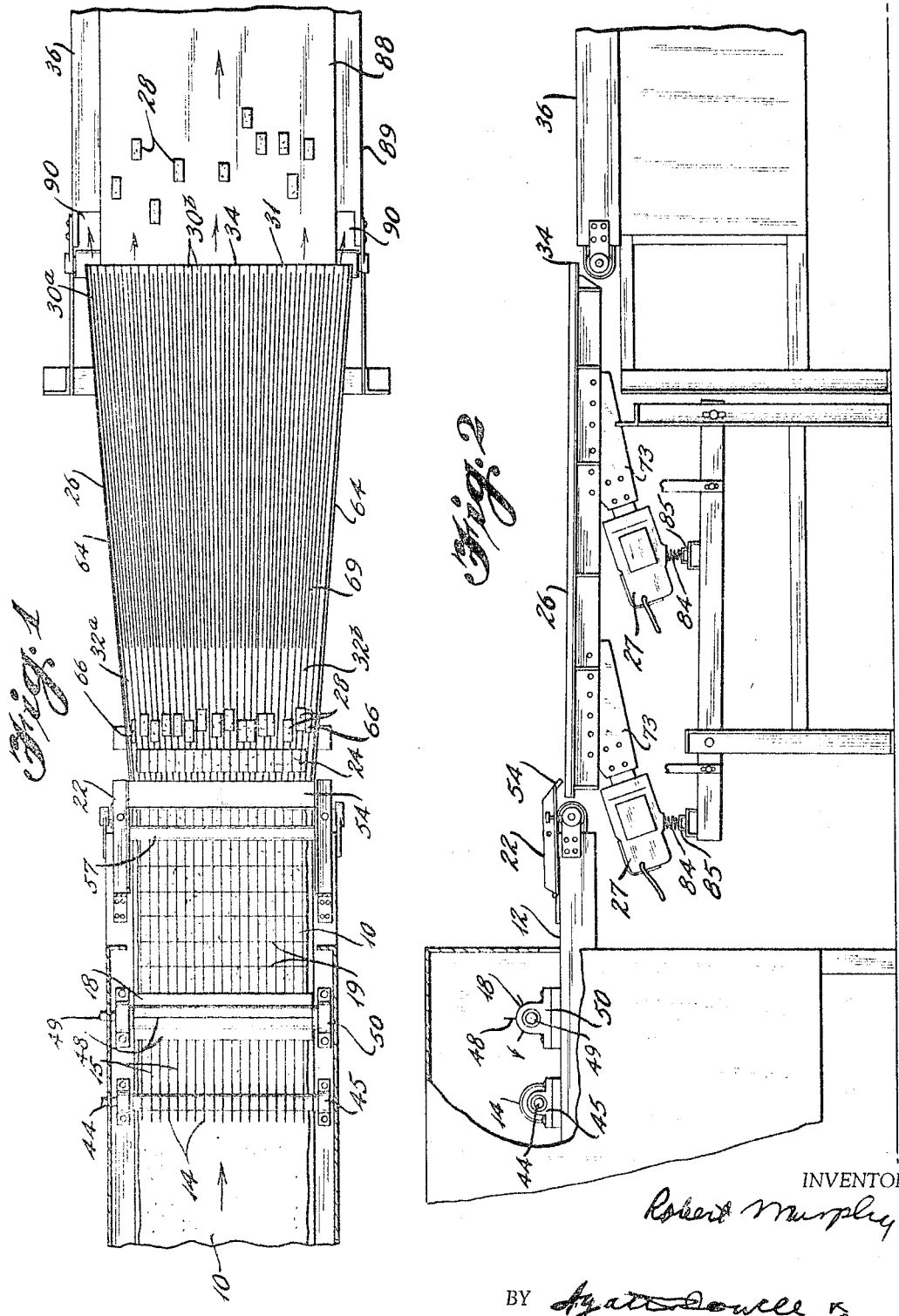
INVENTOR
Robert Murphy
BY
ATTORNEYS Sept. 2, 1969    R. MURPHY    3,464,609
VIBRATORY CANDY BREAKER AND SEPARATOR
Filed May 19, 1967    3 Sheets-Sheet 2
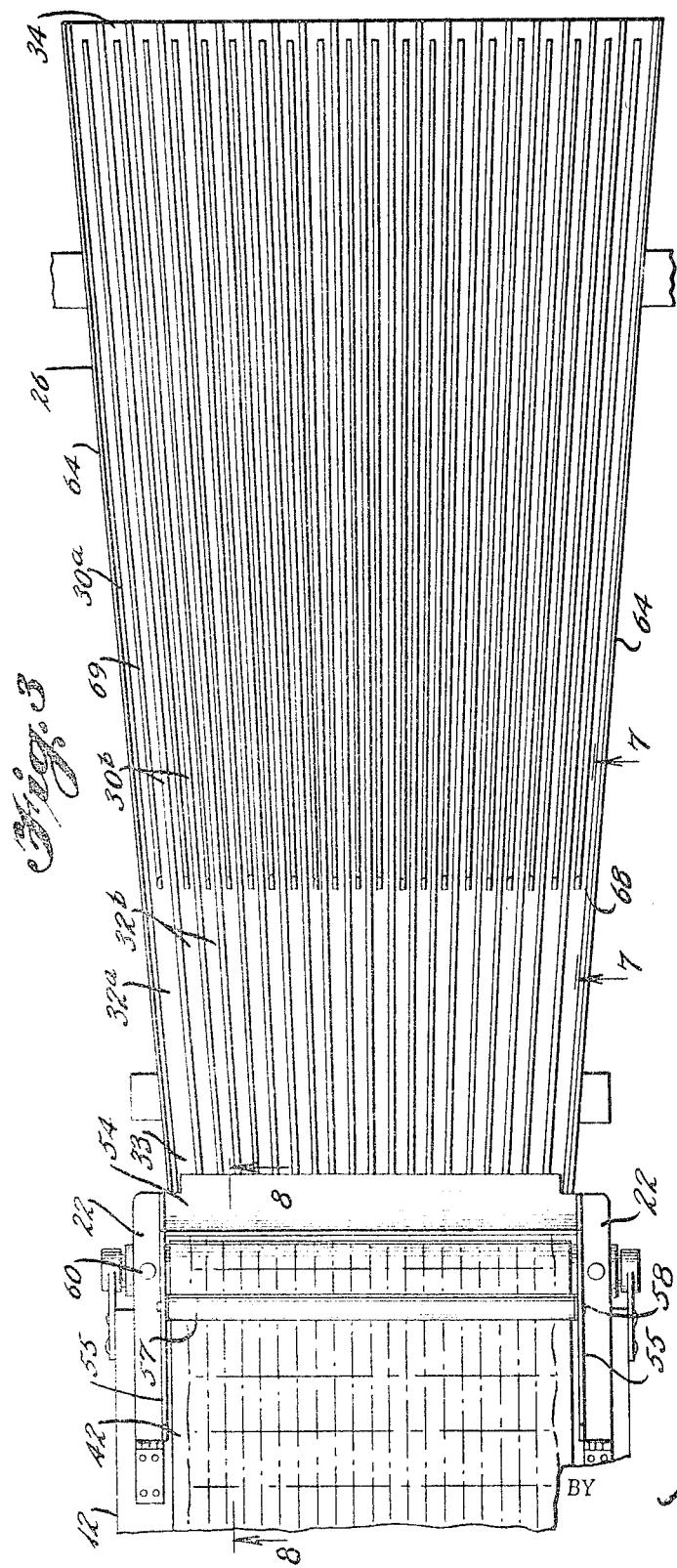
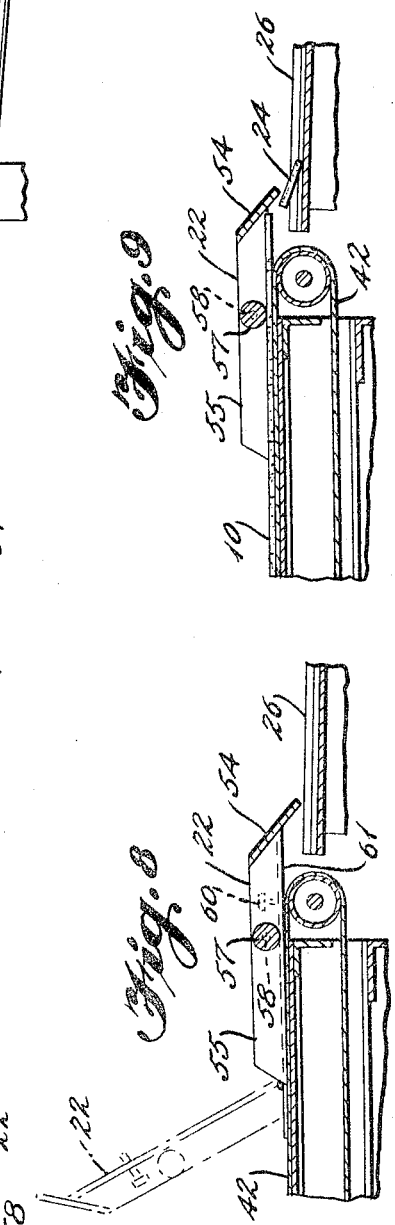
INVENTOR
Robert Murphy
BY
ATTORNEYS

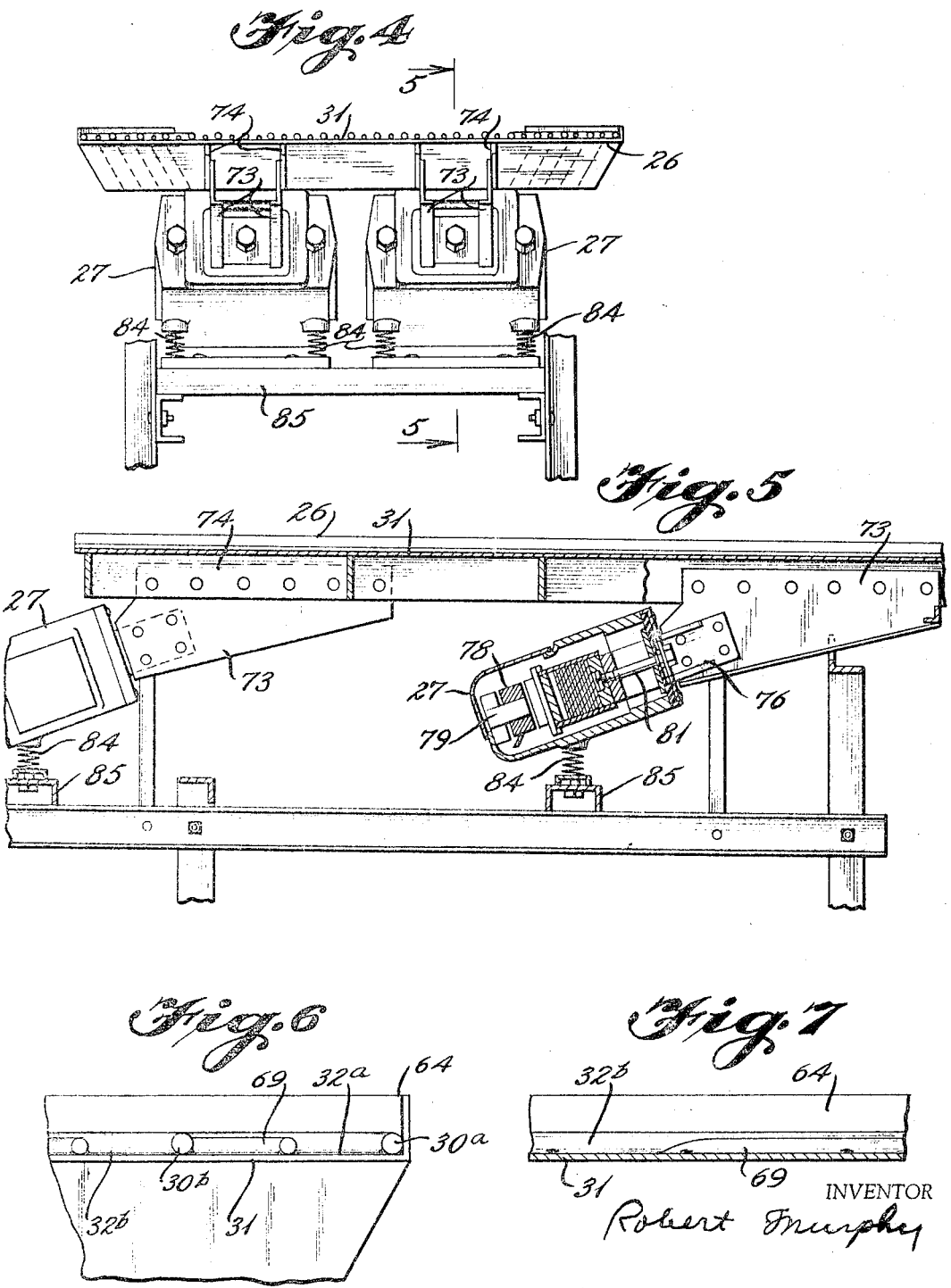

United States Patent Office 3,464,609
Patented Sept. 2, 1969

3,464,609
VIBRATORY CANDY BREAKER AND SEPARATOR
Robert Murphy, Robinson, Ill., assignor to L. S. Heath & Sons, Inc., Robinson, Ill., a corporation of Illinois
Filed May 19, 1967, Ser. No. 639,840
Int. Cl. B26f *3/00, 3/02;* B65h *35/00*
U.S. Cl. 225—96.5                                    13 Claims

ABSTRACT OF THE DISCLOSURE

A unit for breaking a transversely and longitudinally scored sheet of candy into individual bars includes a plate having a plurality of slightly diverging rods welded to its upper surface. The spacing between rods is less than the width of the candy bars at the narrow end of the plate and greater at the wide end. Vibrator units shake the plate with an upward movement to break the candy along the transverse score lines and a quick-forward, slow-return movement to move the candy bars forward. The bars fall between the diverging rods and are delivered from the end of the plate spaced transversely from each other so that automatic equipment can coat and package them.

---

This invention relates to article handling equipment and more particularly to a device for breaking a scored sheet of candy or the like into individual bars, and for spreading such bars into a transversely spaced relationship.

Many commercial candy products consist of central portions covered with chocolate. This central portion is usually cut from a large sheet. In a typical commercial process, a ribbon-like sheet of candy is continuously formed, is longitudinally and transversely scored, and is broken into individual bars. The sheet may be broken manually or automatic breaking equipment may be used. After breaking, the individual bars are spread into a spaced relationship so that they may be coated with chocolate or the like by automatic equipment.

In these processes, the breaking, whether automatic or manual, may not be completely reliable. The candy may fail to break on certain score lines. Resulting multiple bars, if not broken, or removed from the production line before coating with chocolate, may produce a multiple bar which must be discarded or sold at a loss. Even with automatic equipment, operators are normally provided to remove or break such multiple bars.

Separate spreading equipment is normally required to space the bars for later coating and packaging operations. Collection and removal of the scrap from the uneven edge of the candy sheet, so that it will not interfere with the coating and packaging operations, is also a problem.

Among the objects of the present invention is the provision of equipment for reliably breaking a brittle sheet along score lines.

A further object is the provision of an automatic breaking unit which also automatically spreads the separated bars in spaced relationship suitable for further automatic processing.

A further object is the provision of a breaking unit which automatically moves the bars forward.

A further object of the invention is to minimize the personnel needed in the candy manufacturing operation and to reduce the loss of candy caused by the failure of equipment to reliably break sheets along all score lines.

A further object of the invention is the provision of a device for systematically collecting edge scrap.

Other objects and advantages of the invention will be apparent from the following description considered in conjunction with the accompanying drawings in which:

FIG. 1 is a plan view of a portion of a candy manufacturing production line including a vibrating breaking and spreading unit according to the present invention;

FIG. 2, a side view of the candy production line of FIG. 1;

FIG. 3, a plan view of a portion of the structure of FIG. 1, showing the present invention on a larger scale;

FIG. 4, a section on the line 4—4 of FIG. 1;

FIG. 5, a section on the line 5—5 of FIG. 4;

FIG. 6, a fragmentary end view of the vibrating breaking and spreading unit of the present invention;

FIG. 7, a section on the line 7—7 of FIG. 3;

FIG. 8, a section on the line 8—8 of FIG. 3, illustrating the transverse breaking unit in an inoperative position, and showing in broken lines the transverse breaking unit in raised position; and FIG. 9, a section similar to FIG. 8, but illustrating the transverse breaking unit in operation.

Briefly stated, these and other objects are accomplished by providing a unit which breaks a continuously formed ribbon-like sheet of candy having transverse and longitudinal score lines into individual candy bars and which spreads the bars in a spaced relationship. The sheet is first broken into transverse strips along a transverse score line as the leading edge of the continuously moving sheet moves off the end of a delivery conveyor and strikes a downwardly slanting obstruction. The transverse strip of candy falls onto a horizontal plate which has a series of generally longitudinally disposed rods welded to its upper surface. Adjacent rods are substantially parallel to each other but slightly divergent and define candy bar receiving channels. High speed electromagnet vibrating units fixed to the lower surface of the plate vibrate it and the rods. The vibratory thrust is angular to the plane of the plate and has a vertical component which tends to break the candy bars on the longitudinal score lines, and a horizontal component extending in the direction of the rods which moves the candy bars along the plate. The bars move forward and fall into the channels between rods at the point where the rods diverge to a width greater than the bars. Thereafter, the bars move along and are delivered to a receiving conveyor in transversely spaced rows.

Referring to the drawings, FIG. 1, a sheet 10 of candy or the like is carried on a delivery conveyor 12 beneath cutter wheels 14 which form longitudinal score lines 15 and a radial blade cutter 18 which cuts transverse score lines 19. The scored sheet strikes a transverse breaking unit 22 fixed at the end of delivery conveyor 12 and breaks along a transverse score line 19. A transverse strip 24 of candy falls onto a vibratory breaking and spreading unit 26 and quickly breaks into individual candy bars 28. The vibratory breaking and spreading unit 26 includes substantially parallel, but slightly divergent, ⅜₁₆″ rods 30a and 30b welded to the upper surface of a plate 31. Vibrators 27 of the quick-forward, slow-return type are fixed to the bottom of the plate and impart an angular thrust having vertical components which help to break the candy and forward components which move the candy along the plate. The candy falls into channels 32a and 32b between the rods and is delivered from the wide end 34 of the plate 31 onto a receiving conveyor 36 in a transversely spaced relationship. Receiving conveyor 36 carries the bars, now suitably spaced, to other equipment (not shown) which conducts other desired operations such as chocolate coating and packaging.

Delivery conveyor 12 includes a supporting framework 40 and an endless belt 42 which carries candy sheet 10. Cutter wheels 14 are fixed to a shaft 44 transversely disposed above belt 42 and mounted in bearings 45 fixed to framework 40 at each side of the belt. Radial blade cutter 18 includes blades 48 radially fixed to a similar transverse shaft 49 mounted in bearings 50 also fixed to framework 40.

Transverse breaking unit 22 includes a downwardly slanting transverse break plate 54 extending the full width of belt 42 and secured at each end to arms 55. Referring to FIGS. 3, 8 and 9, it will be seen that arms 55 are pivoted to framework 40 at each side of the belt 42 so that break plate 54 can be swung from an inoperative position above conveyor 12 to an operative position. In the operative position, arms 55 are substantially horizontal, and break plate 54 is disposed beyond the end of conveyor 12 so that the end of a candy sheet 10 moving on the upper surface of belt 42 strikes the slanting break plate and is bent downwardly. A transverse roller 57 is mounted on a shaft 58 rotatably mounted in arms 55 and engages the top of candy sheet 10 when break plate 54 is in operative position. Roller 57 braces the top of candy sheet 10 as the end of the candy sheet is bent downwardly by the slanting break plate 54. This causes a transverse strip 24 of candy to break from sheet 10 on a transverse score line 19. An adjusting screw 60 is threaded in a flange 61 of each arm 55 to control the height of roller 57 and break plate 54.

Referring to FIGS. 3 to 7, the structure of the vibratory breaking and spreading unit 26 can be seen in detail. As pointed out previously, the unit includes a horizontal plate 31 having substantially parallel, but slightly divergent, ⅜₆″ rods 30a and 30b welded to its upper surface to form channels 32a and 32b. Rods 30a, hereafter called side rods, are welded to the upper surface just inside and adjacent to an upturned flange 64 at each side of plate 31. Nineteen other rods 30b, hereafter called central rods, are welded to the upper surface of plate 31 between the side rods 30a. Central rods 30b have a spacing of 1⅛″ between centers of adjacent rods at the narrow end 33 of plate 31. This spacing is less than the 1⁵⁄₁₆″ width of candy bars 28. At the wide end 34 of plate 31, the central rods 30b are spaced 1¾″ apart. There are nineteen central rods 30b, and they form eighteen candy bar receiving channels 32b.

The space between a side rod 30a and the closest central rod 30b is 1⅞″ at narrow end 33 and 2¼″ at wide end 34. These rods form a side channel 32a at each side of plate 31 for the receipt of edge scrap 66 from candy sheet 10.

A ⅛″ rod 69 is welded to plate 31 along the center of each channel 32a and 32b. Rods 69 extend from an imaginary transverse line 68 to the wide end 34 of plate 31. The forward edge of rods 69 has a bevel 70 so that the end will not catch and hold candy bars 28. The rods 69 support candy bars 28 and minimize the possibility that candy will stick to the bottom of the channels 32a, and 32b. Rods 69 are not needed at the narrow end 33 of the plate where the channels are too narrow to receive candy, but are needed at the wide end 34.

The lower surface of plate 31 is connected to four electromagnet vibrators 27. The connecting structure includes a pair of connecting plates 76 which are the vibrating part of the vibrators 27, a wing plate 73 fixed to each connecting plate, and a longitudinal brace 74 fixed to both the wing plate 73 and the lower surface of plate 31. The vibrators 27 include appropriate structure shown schematically in FIG. 5 for imparting a vibrational thrust on the pair of connecting plates 76. Units manufactured by The Syntron Company, Homer City, Pa., under the trade name Vibraflo, Model F–212–A have been found satisfactory. These vibrators include a solenoid coil 78 for pulling the magnetizable core 79 slowly backwards and leaf springs 80 for thrusting the core quickly forward. Since the leaf springs move the core more quickly than the solenoid, the leaf springs impart a greater acceleration force on the plate 31 than does the solenoid. Ajusting screw 81 controls the length of the stroke. With 60-cycle alternating current, units 27 vibrate at 3600 cycles per minute. The vibrators are loosely mounted on coil springs 84 on a support 85. They are so disposed that the magnetizable core moves in a line having both a vertical component and a longitudinally extending horizontal component.

Candy bars 28 are moved forward by the horizontal acceleration forces imparted by the leaf springs to the wide end 34 of the plate and are delivered onto an endless belt on receiving conveyor 36. The support frame 89 for the receiving conveyor 36 includes openings 90 arranged at each side of the belt 88. Openings 90 are aligned with side channels 32a of the vibratory breaking and spreading unit 26 and receive the candy edge scrap 66. This scrap can be collected in any desired fashion after it passes through openings 90. Collection containers or chutes might be used for example.

The diverging channels 32b deliver the candy bars 28 in a transversely spaced relation suitable for coating and packaging operation. Belt 88 can be run at a faster speed than the delivery speed of candy from unit 26 to longitudinally space the candy, or, alternatively, a third conveyor can be provided to longitudinally space the candy bars.

In operation a sheet 10 of candy on delivery conveyor 12 is longitudinally and transversely scored by cutter wheels 14 and radial blade cutter 18 respectively. A transverse strip of candy 24 is broken from the sheet along a transverse score line 19 by the downward bending action placed upon the end of a moving sheet by transverse break plate 54 as transverse roller 57 holds the remainder of the sheet in horizontal position. Adjusting screw 60 can be raised or lowered to compensate for different thicknesses of candy or as is necessary for smooth operation and clean breaking action.

Since each cutter wheel 14 is aligned with the nearest end of an associated central rod 30b, the longitudinal score lines 15 on the candy strip are substantially aligned with the central rods 30b. In practice it has been found that the candy breaks into individual bars almost as soon as it falls on the vibrating breaking and spreading unit 26. The breaking action is very reliable. If a candy bar should fail to break at the narrow end of the channels 32b, it will be subjected to a continuous breaking force as the angular thrust from the vibrators moves it along the top of the rods with a hopping action which continues for approximately 6 feet.

When the candy bar 28 or the edge scrap 66 reaches an area where the channels 32a or 32b are sufficiently wide, it falls into contact with the top of a rod 69. While the candy may be sticky, only a small portion of it will contact the rod 69. Accordingly, it is not as likely to stick as it would in a flat bottomed channel.

As the forward component of the vibratory thrust continues to move the candy forward, the diverging of the channels 32b spreads the candy so that the bars 28 are delivered to endless belt 88 on the receiving conveyor 36, and the candy edge scrap 66 falls into openings 90 for collection.

It will be apparent that automatic equipment has been provided which both breaks a scored sheet of candy into individual bars and spreads them into a spaced relationship. In addition, it will be apparent that the equipment is inherently reliable in operation in that a continuous vibrating force is exerted beneath the longitudinal score lines until the candy breaks and the individual bars fall into their channels, and that the need for human supervision is reduced.

It will be obvious to one skilled in the art that various changes may be made in the invention without departing from the spirit and scope thereof, and, therefore, the invention is not limited by that which is illustrated in the

What is claimed is:
1. An article handling device comprising:
a plurality of rigid rod members, each being substantially parallel to an adjacent rod member,
means for holding the rods in substantially parallel relationship in a generally horizontal plane,
means for subjecting the rods to vibratory movement, and
means for delivering a brittle sheet onto the top of the vibrating rods, said brittle sheet having score lines running longitudinally of the rods.

2. The structure of claim 1 including means for breaking a scored sheet delivered to the top of said rods along score lines transverse to said rods, whereby a transversely and longitudinally scored sheet will be broken on transverse lines by said transverse breaking means and broken on the longitudinal lines by the vibratory motion of said rods.

3. The structure of claim 1 in which the vibrating means are arranged to impart a movement extending in the direction of the rods, which has a faster acceleration in one direction than the other.

4. The structure of claim 1 including object supporting means fixed between and slightly below the rod members, whereby the rigid members define channels for the receipt of objects therebetween.

5. The structure of claim 4 in which the said substantially parallel rods diverge slightly from true parallelism, and means for imparting a forward movement to objects on top of the rods whereby the said vibrating rods will separate and spread a plurality of articles placed on top of the rods.

6. The structure of claim 4 in which the object supporting means is a plate secured to the bottom of the rigid members.

7. The structure of claim 6 in which rigid members are rods of round cross section secured to the plate.

8. The structure of claim 7 in which rods of smaller diameter than the first mentioned rods are secured to the plate substantially parallel to and between the larger rods.

9. The structure of claim 7 in which the rods diverge in a fan shape.

10. The structure of claim 9 in which the plate is arranged in a substantially horizontal plane and the vibrating means are arranged to impart an angular thrust, having both a vertical component and a horizontal component extending in the direction of the rods.

11. The structure of claim 10 in which the vibrating means have a greater acceleration in the direction of rod divergence than in the other direction, whereby the brittle sheet is broken into individual bars and moved along the top of the plate.

12. The structure of claim 11 including an article receiving conveyor arranged at the diverging end of the rods for carrying articles previously broken and transversely spread by said vibrating rods, said article receiving conveyor moving at a speed faster than the speed at which the brittle sheet is delivered to the plate, whereby articles are longitudinally spread on the article receiving conveyor.

13. Apparatus for breaking and separating a sheet of brittle material comprising first conveyor means for receiving and supporting the sheet of material, means for scoring the material along longitudinal and transverse lines, transverse breaker means for breaking the sheet of material into strips along said transverse score lines, second conveyor means receiving said strips of material, said second conveyor means having a plurality of diverging guide members, one end of said guide members being spaced apart a distance substantially equal to the spacing of said transverse score lines and the other end of said guide members being spaced apart a distance greater than the spacing of said transverse score lines, and said second conveyor means located below said transverse breaker means, whereby said strips of material fall by gravity onto the guide members of said second conveyor means and break into individual pieces along said longitudinal score lines and thereafter are discharged from said second conveyor means.

References Cited

UNITED STATES PATENTS

| | | | |
|---|---|---|---|
| 2,850,161 | 9/1958 | Reilly | 209—99 |
| 3,089,697 | 5/1963 | Brozo | 271—62 X |
| 3,172,588 | 3/1965 | Bertold et al. | 225—93 |
| 3,211,289 | 10/1965 | Brumagin | 209—99 |
| 3,295,667 | 1/1967 | Kittle | 198—220 |
| 3,301,454 | 1/1967 | Wayne et al. | 225—97 |

JAMES M. MEISTER, Primary Examiner

U.S. Cl. X.R.

225—97